US011104402B1

(12) United States Patent
Susnjara

(10) Patent No.: US 11,104,402 B1
(45) Date of Patent: Aug. 31, 2021

(54) METHODS AND SYSTEMS FOR PRODUCING BOAT COMPONENTS

(71) Applicant: Thermwood Corporation, Dale, IN (US)

(72) Inventor: Kenneth J. Susnjara, Dale, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/917,047

(22) Filed: Jun. 30, 2020

(51) Int. Cl.
*B29C 64/118* (2017.01)
*B63B 5/24* (2006.01)
*B29C 33/38* (2006.01)
*B33Y 80/00* (2015.01)
*B33Y 10/00* (2015.01)

(52) U.S. Cl.
CPC ............ *B63B 5/24* (2013.01); *B29C 33/3842* (2013.01); *B29C 64/118* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 3,217,356 A | * | 11/1965 | Stutsman | B29C 33/00 425/421 |
| 3,282,761 A | * | 11/1966 | Evangelist | B29C 33/30 156/249 |
| 3,806,304 A | * | 4/1974 | Tighe | B63B 5/24 425/470 |
| 7,731,816 B2 | | 6/2010 | Oldani et al. | |
| 7,810,539 B2 | | 10/2010 | Mischler et al. | |
| 8,151,854 B2 | | 4/2012 | Oldani | |
| 8,534,338 B2 | | 9/2013 | Oldani et al. | |
| 8,954,180 B2 | | 2/2015 | Oldani | |
| 2007/0044899 A1 | | 3/2007 | Tingley | |
| 2008/0006017 A1 | | 1/2008 | Rindels | |
| 2010/0200168 A1 | | 8/2010 | Oldani et al. | |
| 2012/0073489 A1 | * | 3/2012 | Roberts | B63B 73/00 114/271 |
| 2016/0318248 A1 | * | 11/2016 | Susnjara | B25J 9/026 |
| 2018/0050502 A1 | | 2/2018 | Oldani | |

OTHER PUBLICATIONS

Sloan, "Big additive machines tackle large molds," CompositesWorld, Jun. 11, 2019, (8 pages).

* cited by examiner

*Primary Examiner* — Matthew J Daniels
*Assistant Examiner* — Mohammad M Ameen
(74) *Attorney, Agent, or Firm* — Bookoff McAndrews, PLLC

(57) ABSTRACT

An additive manufacturing method ay includes depositing thermoplastic material with an additive manufacturing apparatus to form a first section of a mold of a marine article. The first section includes an interior surface having a shape corresponding to a first portion of a hull of the marine article and a support portion including a support surface, the support portion being integrally formed with the interior surface. The method also includes depositing thermoplastic material to form a second section of a mold of a marine article, the second section including an interior surface having a shape corresponding to a second portion of a hull of the marine article. The method also includes joining the first section and the first section together to form at least a portion of the mold.

20 Claims, 10 Drawing Sheets

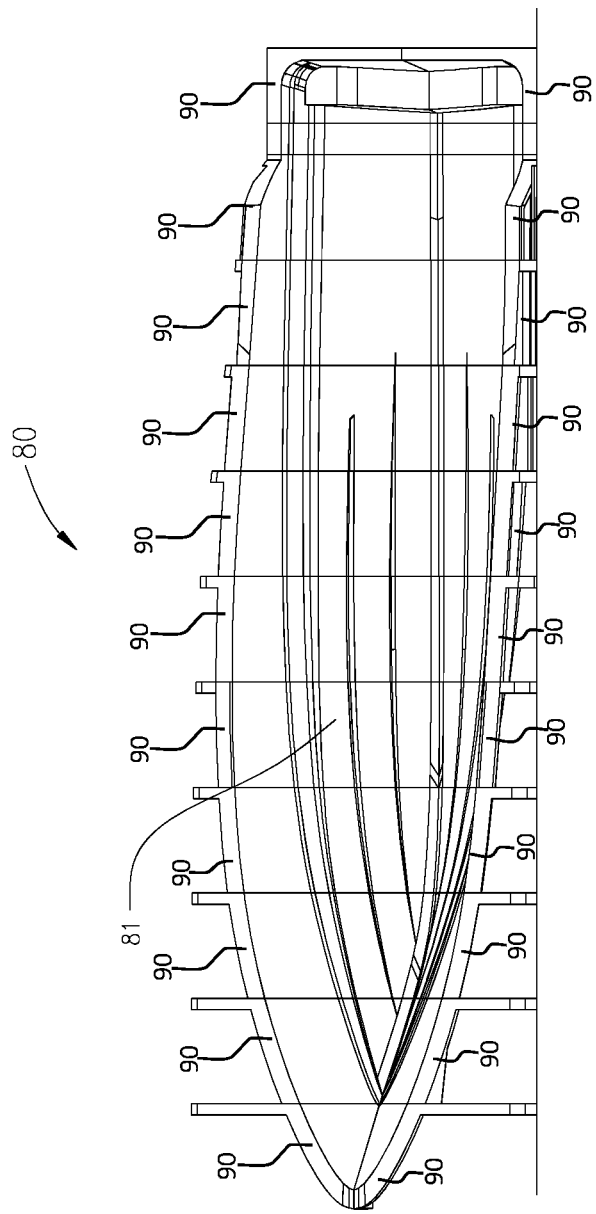
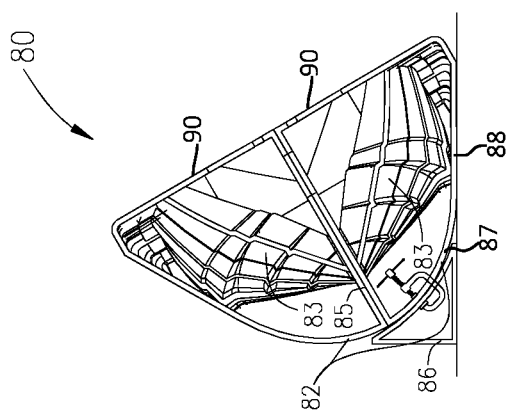
Fig. 7A
Fig. 7B

METHODS AND SYSTEMS FOR PRODUCING BOAT COMPONENTS

TECHNICAL FIELD

Aspects of the present disclosure relate to apparatus and methods for fabricating components. In some instances, aspects of the present disclosure relate to apparatus and methods for fabricating components (such as, e.g., marine items or components including boat molds, boat hulls, and associated parts, automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including e.g., freeform fabrication, 3D printing, rapid prototyping/tooling, etc. Additive manufacturing techniques may be used to fabricate simple or complex components from a wide variety of materials. For example, a freestanding object can be fabricated from a computer-aided design (CAD) model.

A particular type of additive manufacturing is commonly known as 3D printing. One such process, commonly referred to as Fused Deposition Modeling (FDM) comprises a process of melting a relatively thin layer of thermoplastic material, and applying this material in layers to produce a final part. This is commonly accomplished by passing a continuous thin filament of thermoplastic material through a heated nozzle, which melts and applies the material to the structure being printed. The heated material may be applied to the existing structure in thin layers, melting and fusing with the existing material to produce a solid finished product.

The filament used in the aforementioned process is generally produced using a plastic extruder, which is comprised of a specially designed steel screw configured to rotate inside a heated steel barrel. Thermoplastic material, in the form of small pellets, is introduced into one end of the rotating screw. Friction from the rotating screw, combined with heat from the barrel, softens the plastic, which is then forced under pressure through a small round opening in a die attached to the front of the extruder barrel. This extrudes a string of material which is cooled and coiled up for use in the 3D printer.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of large parts or a large number of items.

In some instances, 3D printing a part may involve a two-step process. In some aspects, 3D printing may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

Print heads of additive manufacturing machines used to print thermoplastic material in relatively large beads generally include a vertically-mounted extruder and a print nozzle to direct a round print bead downward onto a surface and/or part being printed. In some cases, the flowable material, such as, e.g., molten thermoplastic material, may be infused with a reinforcing material (e.g., strands of fiber) to enhance the material's strength. The flowable material, while hot and pliable, may be deposited upon a substrate (e.g., a mold), and then pressed down or otherwise flattened, and/or leveled to a consistent thickness. These traditional print heads may include an oscillating plate surrounding the nozzle, the plate being configured to oscillate vertically to flatten the bead of material against the previous layer of material. An alternative approach utilizes a wheel rotatably mounted about the centerline of the nozzle. The wheel may be rotated to trail the direction the nozzle is moving, the wheel flattening the deposited bead of material as the nozzle moves. The deposition process may be repeated so that each successive layer of flowable material is deposited upon an existing layer to build up and manufacture a desired structure for a component or part. In order to achieve proper bonding between printed layers, it may be necessary to ensure the temperature of the previously-deposited layer is within a certain range. For example, the previously-deposited layer may need to have cooled by an appropriate amount and thereby solidified sufficiently to support the weight of the new layer. However, this previously-deposited layer may also be sufficiently warm to soften and fuse with the new layer, thus producing a solid part.

Some techniques for building molds for large boat or yacht fiberglass hulls, which do not involve 3D printing, are generally expensive and time-consuming. Molds manufactured by conventional methods may be built-up using one of a number of various approaches, which involve building a structure, coating the built-up structure with fiberglass and/or other materials, and then smoothing or machining the surface of the resulting mold to the desired size and shape. The structures may include one or more of a variety of build materials, such as wood, medium density fiberboard (MDF), styrofoam, fiberglass, resins (e.g., Bondo® material produced by 3M), and various other materials. These materials may require different shaping techniques, as well as significant amounts of time to apply. The process generally requires multiple skilled craftsmen, and months or years to complete. Thus, conventional processes may be improved by employing a large-scale 3D printing process to produce molds.

Additive manufacturing or 3D printing processes may reduce the time and personnel requirements associated with the production of a mold for a boat or marine article. For example, large scale 3D printing processes may be performed by a first operator that may perform a printing process via the additive manufacturing apparatus, and a second operator that may perform a trimming process, with the same or a different additive manufacturing apparatus. If desired, a single operator may be able to perform both printing and trimming processes with a single additive manufacturing apparatus.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An object of the present disclosure is an approach for utilizing an additive manufacturing apparatus, which may be configured to implement a large scale 3D printing process, to produce a mold for a large boat or yacht hull. This 3D printing process may be significantly faster and less expensive than conventional processes. Moreover, such 3D printing processes may include features that make use of the additive manufacturing machine to produce a boat mold easier and more efficient.

Molds described herein may incorporate various exemplary features associated with manufacturing via a 3D printing process. For example, the mold, which itself may be formed by additive manufacturing, and may include a surface configured to define the outside of a hull of a boat. As another example, a series of angled, curved, or circular-shaped supports may be molded, or formed integrally, with the outside of the mold. Each support may be attached to a desired end of one or more mold sections that together form the mold. In some aspects, while the mold may include tapers and curves forming regions having different diameters and dimensions, a curved or circular outside surface may be formed by integrally-molded supports. In some aspects, curved supports may each be formed with the same diameter, radius of curvature, and/or other dimensions. Such supports may be cradled in 3D-printed cradles which are machined to fit and receive the curved outer surfaces of the mold supports. In this manner, the entire mold may be rotatable via a series of cradles, which may advantageously provide improved access to the mold surface for application of fiberglass material or other treatments to the mold surface.

In at least some aspects, an entirety of the mold may, while resting on the floor, be rotated in a desired direction by rolling the mold with an outer surface defined by the curved or circular supports. The entire mold, while positioned on the floor or another suitable surface via on or more supports, may be rotated on to a desired position. Once in the desired position, the mold may be held or otherwise secured in place with a suitable mechanism, such as a wedge clamped to the supports. This approach may facilitate the process of applying the fiberglass material to the inside surface of the mold, which has a shape corresponding to an outside surface of a component of a boat, such as a boat hull or portion thereof.

An exemplary mold may include two separable mold halves. These mold halves may be configured to be fastened together along a bottom seam that extends along an entire length of the hull with respect to a longitudinal direction defined by the mold. In this way, when the hull, which may include fiberglass and/or other suitable materials, is complete and fully cured, the two mold halves can be unfastened from each other and pulled apart. This separation may facilitate the removal of the finished hull from the mold. Wedges may be clamped to the supports in a manner that allows the two halves of the mold to remain upright while being pulled apart or separated from each other.

In order to produce relatively large molds, which may be considerably larger than even the largest 3D printer (or other additive manufacturing device), the molds may be manufactured or printed in separate sections. These sections may be fastened to each other with fasteners (e.g., permanent fasteners) and/or bonded together to produce two mold halves. The two mold halves may themselves be subsequently fastened together with removable fasteners to receive curable material configured to form the full mold of a boat hull.

Although the exemplary systems and methods described herein may employ mold supports that are generally curved or round and ride in, or are supported by, printed channels, this configuration is only exemplary. For example, the additive manufacturing apparatus, methods, and systems described herein may accomplish the production of a boat mold and/or hull via any suitably-formed mold section and/or mold support. For example, the mold supports may include one or more flat surfaces instead of curved or rounded surface. In particular, mold supports may include a respective series of flat surface configured to allow the mold to rest directly on the floor, on a flat platform, or on any suitable surface in any desired orientation.

In one aspect, an additive manufacturing method may include depositing thermoplastic material with an additive manufacturing apparatus to form a first section of a mold of a marine article. The first section may include an interior surface having a shape corresponding to a first portion of a hull of the marine article and a support portion including a support surface, the support portion being integrally formed with the interior surface. The method may also include depositing thermoplastic material to form a second section of a mold of a marine article, the second section including an interior surface having a shape corresponding to a second portion of a hull of the marine article. The method may also include joining the first section and the first section together to form at least a portion of the mold.

In another aspect, a method may include providing material to an extruder of an additive manufacturing apparatus, heating the material to form a flowable material, and depositing the flowable material with the additive manufacturing apparatus to form an interior portion having a shape corresponding to a portion of a hull of the marine article. The method may also include depositing the flowable material with the additive manufacturing apparatus to form a support portion including a support surface, wherein the support portion and the interior portion are portions of a boat mold.

In yet another aspect, a mold for a marine article may include a plurality of sections, each section including an interior surface having a shape corresponding to a first portion of a marine article and a support portion extending outwardly with respect to the interior surface and including a curved support surface. The marine article may include a seam extending between a first group of the plurality of sections and a second group of the plurality of sections.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 7A is a front view of the 3D-printed mold of FIG. 5 showing the mold laying on flat sides of the supports;

FIG. 7B is a side view of the 3D-printed mold of FIG. 5 showing the mold laying on flat sides of the supports;

DETAILED DESCRIPTION

The present disclosure is drawn to, among other things, methods and apparatus for fabricating multiple components via additive manufacturing or 3D printing techniques. Specifically, the methods and apparatus described herein may comprise an approach that employs a large-scale 3D-printing process to produce a mold for a large boat or yacht hull in a manner that may be faster, less expensive, and with features that make use of the mold easier and more efficient.

Figure 1:
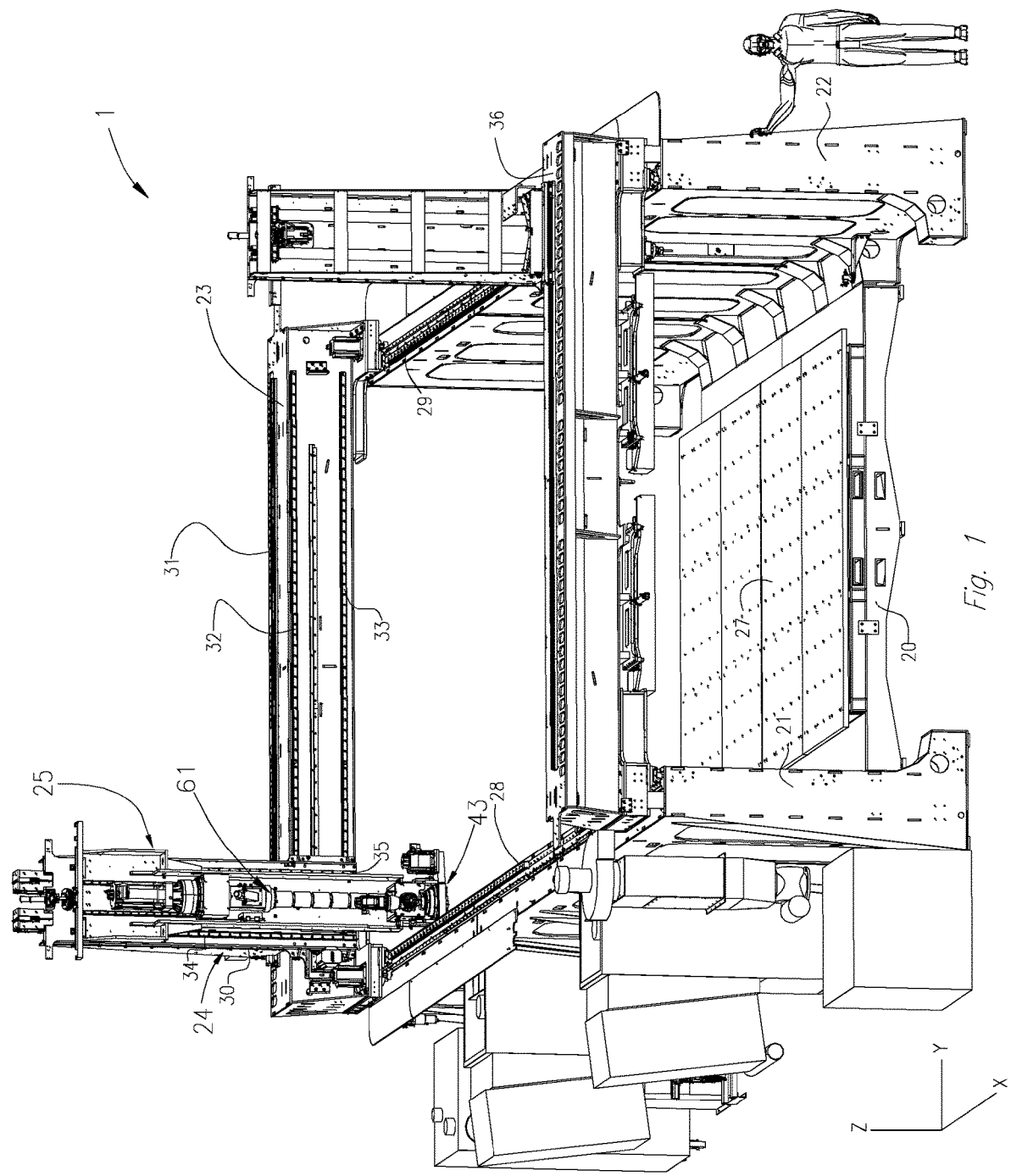
FIG. 1 is a perspective view of an exemplary CNC machine or additive manufacturing apparatus for use with an additive manufacturing process for forming articles, according to an aspect of the present disclosure.

Referring to FIG. 1, an additive manufacturing apparatus, such as CNC machine 1, may include a bed 20 having a pair of transversely spaced side walls 21 and 22, a printing gantry 23, a trimming gantry 36, a carriage 24 mounted on printing gantry 23, a carrier 25 mounted on carriage 24, an extruder 61, and an applicator assembly or applicator head 43 mounted on carrier 25. Printing gantry 23 and trimming gantry 36 may be supported on side walls 21 and 22. A horizontal worktable 27 having a support surface disposed in an x-y plane may be supported on bed 20 between side walls 21 and 22. Printing gantry 23 and trimming gantry 36 may be disposed so as to extend along a y-axis, supported at respective ends thereof on end walls 21 and 22. Printing gantry 23 and trimming gantry 36 may be movable with respect to an x-axis on a set of shared, approximately parallel guide rails 28 and 29 provided on the upper ends of side walls 21 and 22. Printing gantry 23 and trimming gantry 36 may each be displaceable by one or more (e.g., a set of) servomotors mounted on the printing gantry 23 and trimming gantry 36, respectively. For example, printing gantry 23 and trimming gantry 36 may be operatively connected to tracks provided on the side walls 21 and 22 of the bed 20. Carriage 24 may be supported on printing gantry 23 and provided with a support member 30 mounted on and displaceable along one or more guide rails 31, 32, and 33 provided on the printing gantry 23. Carriage 24 may be displaceable along a y-axis along one or more guide rails 31, 32, and 33 via a servomotor mounted on the printing gantry 23 and operatively connected to support member 30. Carrier 25 may be mounted on a set of spaced, vertically-disposed guide rails 34 and 35 supported on carriage 24 for displacement of the carrier 25 relative to carriage 24 along a z-axis. Carrier 25 may be displaceable along the z-axis by a servomotor mounted on the carriage 24 and operatively connected to the carrier 25.

Figure 2:
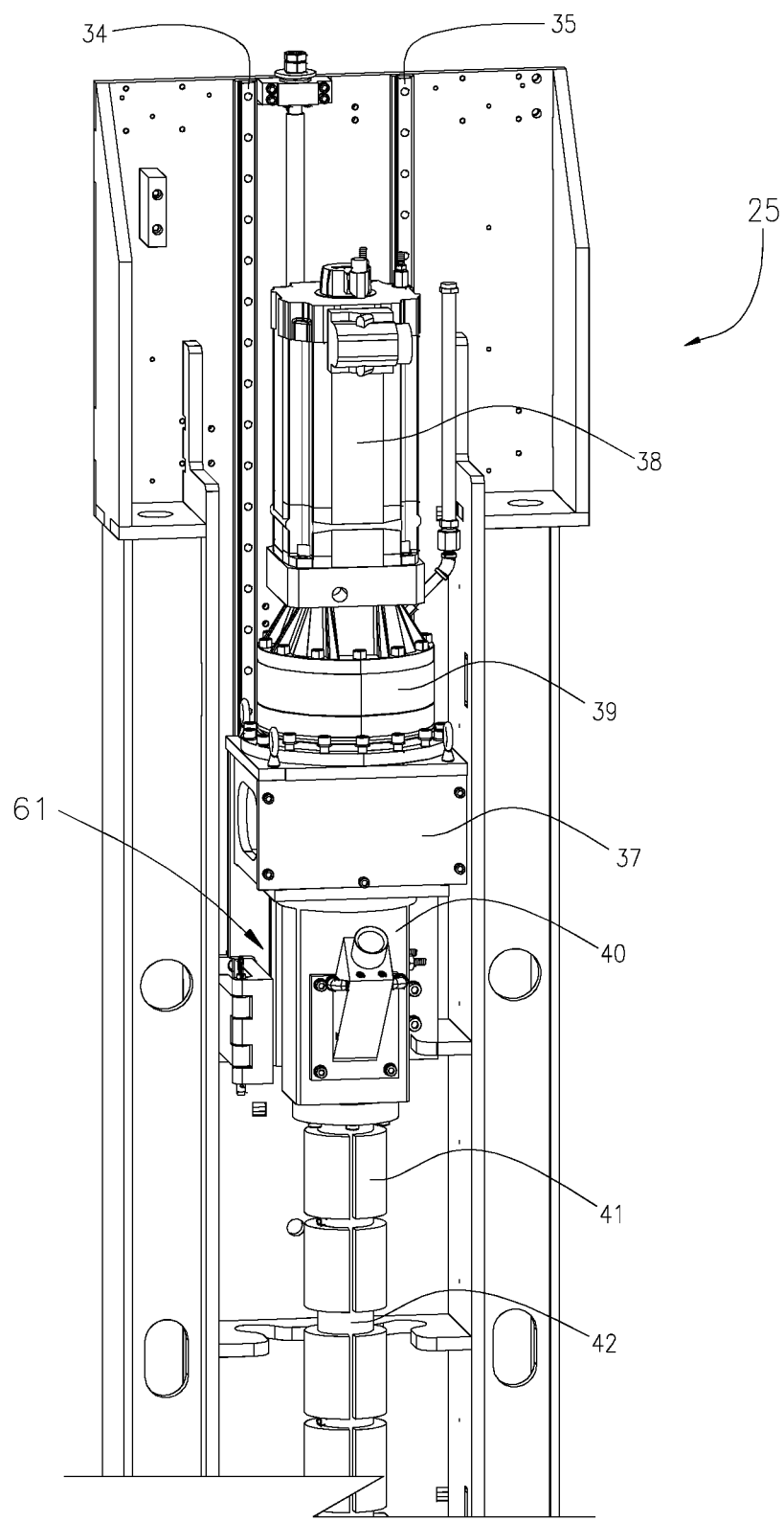
FIG. 2 is a perspective view of an exemplary carrier and extruder assembly of the exemplary additive manufacturing apparatus shown in FIG. 1.

As best shown in FIG. 2, extruder 61 may be mounted, in a linearly-movable manner, to carrier 25. For example, extruder 61 may be movably mounted on a set of rails 34 and 35 (FIG. 1) via suitable bearings. A servomotor 38 may drive an extruder screw of extruder 61 through a gearbox 39 attached to transition housing 37. Extruder 61 may receive thermoplastic pellets at the feed housing 40 so that the extruder screw transfers the thermoplastic material down through the barrel 42 where it is melted by the friction of the screw and heaters 41. This melted thermoplastic material may flow, via extruder 61, to a positive displacement melt pump or gear pump 62 (FIG. 3).

Figure 3:
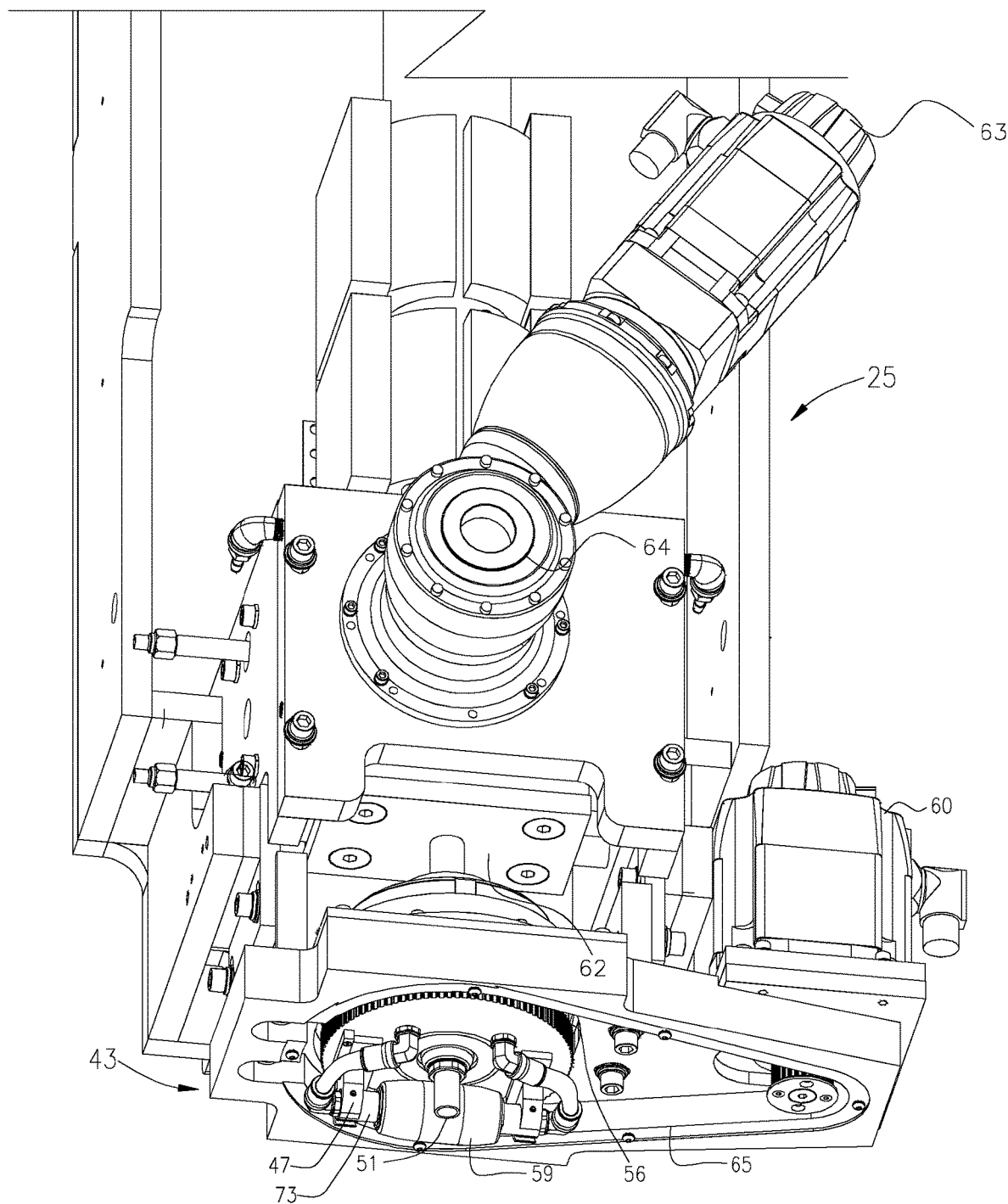
FIG. 3 is an enlarged perspective view of an exemplary carrier and applicator assembly of the additive manufacturing apparatus shown in FIG. 1.

As best shown in FIG. 3, gear pump 62 may be securely mounted to the bottom of carrier 25. Gear pump 62 may be driven by a servomotor 63 through a gearbox 64, and may receive molten plastic (e.g., thermoplastic material) from extruder 61 (FIG. 2), and meter precise amounts of thermoplastic material at predetermined flow rates to nozzle 51 to print the part (e.g., a section 90 of a boat mold 80, as described below). Applicator head 43 may be attached at a position below gear pump 62. Applicator head 43 may include a bead shaping roller 59 rotationally mounted in carrier bracket 47. Roller 59 may provide a means for flattening and leveling an oversized bead of fluid material (e.g., molten thermoplastic) extruded out of nozzle 51. Carrier bracket 47 may be adapted to be rotationally displaced by means of a servomotor 60, through a pulley or sprocket 56 and belt or chain 65 arrangement.

Figure 4:
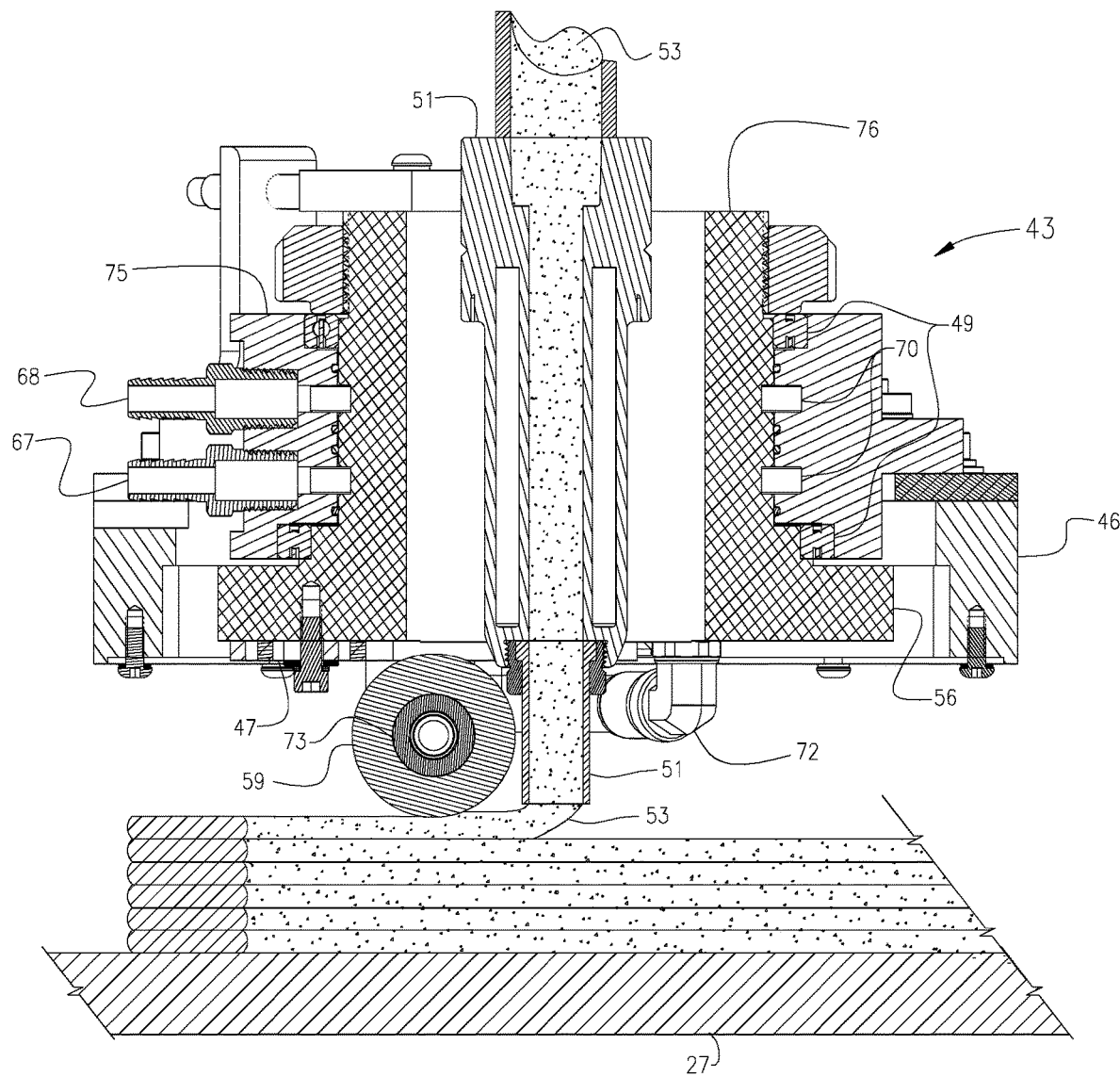
FIG. 4 is an enlarged cross-sectional view of the applicator head assembly shown in FIG. 3.

With reference to FIG. 4, applicator head 43 may include a housing 46 with rotary union mounted therein. Pulley or sprocket 56 may be machined into the inner hub 76 of the rotary union. An inner hub 76 may have an opening with a sufficiently large diameter to allow the heated print nozzle 51 to pass therethrough. Inner hub 76 may rotate on a set of bearings 49 contained within outer housing 75 of the rotary union. The compression roller assembly may be attached to the inner hub 76 of the rotary union so that the compression roller 59 rotates about the print nozzle 51. The rotary union may also contain barb fittings 67 and 68 ported into coolant passages 70 that encompass or surround the inner hub 76 and the inside of the outer housing 75 of the rotary union. The coolant passages 70 may extend to quick disconnect fittings 72 in fluid communication with an axle 73 of compression roller 59.

As shown in FIGS. 2-4, an oversized molten bead of flowable material (e.g., molten thermoplastic) may be provided under pressure from a source disposed on carrier 25 (e.g., gear pump 62) or another source. The bead of flowable material may be provided to applicator head 43. Thus, gear pump 62, (or another source of flowable material), may be securely connected to, and in communication with, nozzle 51. In use, the flowable material 53 (e.g., thermoplastic material) may be heated sufficiently to form a large molten bead of material, which may be extruded through applicator nozzle 51 to form large, uniform, and smooth rows of deposited material on surface 27. Such beads of molten material may be flattened, leveled, and/or fused to adjoining layers with substantially no trapped air by bead-shaping compression roller 59. Successive layers of this material may be deposited to form 3D-printed products such as boat molds, boat mold sections, supports, etc., described below.

Figure 5:
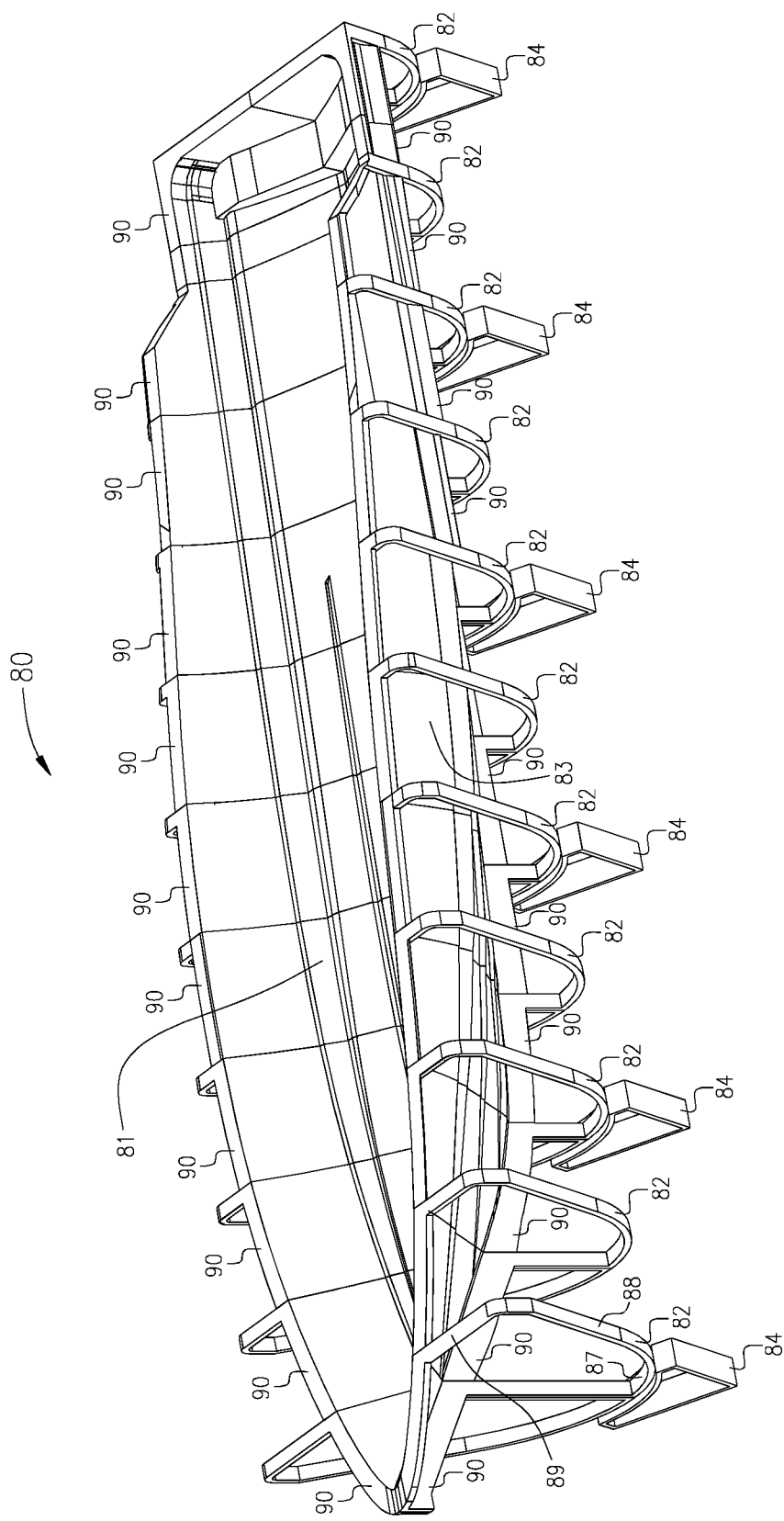
FIG. 5 is a perspective view of an exemplary 3D-printed mold for a large boat or yacht.

In some aspects, the additive manufacturing apparatus (e.g., CNC machine 1) and methods described herein may be employed to produce a mold 80, as shown in FIG. 5. Mold 80 may incorporate one or more features which may be applied during the 3D printing process. While exemplary features are described herein, mold 80 may include one or more additional features incorporated via additive manufacturing (e.g., 3D printing).

Mold 80 may include a surface 81 that forms an inside surface of mold 80. This inside surface 81 may be configured to define an outside or exterior surface of a hull of a boat formed by use of mold 80. For example, surface 81 may be a relatively smooth, finished and/or polished surface, configured to receive materials, such as composites, which are useful for producing a boat hull. Exemplary suitable materials for forming the hull may include fiberglass (e.g., fiberglass-reinforced plastic or glass-reinforced plastic, which may include glass fibers and a resin). In some aspects, a 3D printing process may facilitate changes in the size and shape of features, portions, or even an entirety of the produced hull, e.g., by altering surface 81. For example, it may be desirable to significantly alter, replace, or remove one or more features of the hull of the boat, which may require the production of an entirely new mold 80. By manufacturing a boat hull using an additive manufacturing process (e.g., 3D printing), as described herein, a new mold 80 having a different size, shape, or both, may be produced significantly faster as compared with manual processes for forming a mold, which may require months or even years to complete.

Figure 6:
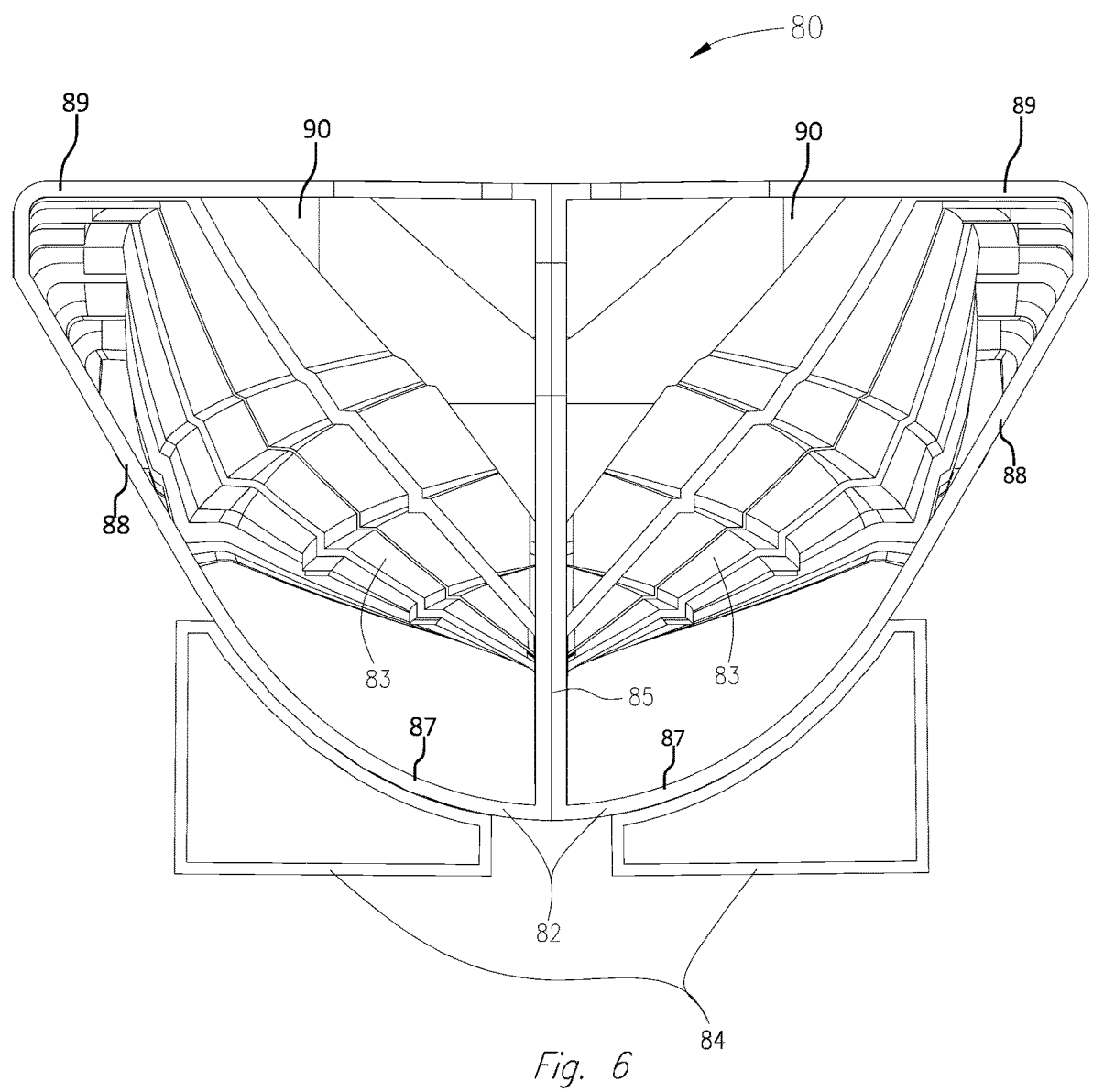
FIG. 6 is a front view of the 3D-printed mold of FIG. 5 including molded supports and cradles.

As shown in FIGS. 5 and 6, one or more support portions or supports 82, which may be partially or entirely angled, curved, and/or substantially circular, may be molded into (e.g., integrally formed with) an outer surface 83 of mold 80, for example. Pairs of supports 82 may extend from opposing lateral ends of mold 80. Outer surface 83 of mold 80 may include tapers and/or curves, which may tend to cause the location of the outer surface of mold 80 to vary along its length. However, at least a portion of each molded support 82 may have a corresponding (e.g., substantially the same) diameter and/or dimensions. In fact, the diameter or dimensions of one or more portions of supports 82 may be the same for a plurality of differently-shaped molds 80, if desired. Supports 82 may be received or cradled by respective cradles or support stands 84, which may themselves be formed by additive manufacturing. In one aspect, stands 84 may be machined to fit and accept the outside surface (e.g., a curved surface of portion 87 described below) of supports 82 of mold 80. Thus, each stand 84 may include a curved surface that has a shape that is complementary to (approximately matches) a shape of the surface (e.g., a curved surface) of a corresponding support 82. While one cradle or stand 84 may be shaped to support a plurality (e.g., two) corresponding supports 82, a separate cradle or stand 84 may be provided for each support 82, if desired.

As shown in FIG. 5, mold 80 may include a plurality of mold sections 90 each provided with a respective support 82. When a plurality of mold sections 90 are formed with supports 82 having the same diameter (e.g., at least a portion of each support 82 may be aligned along a longitudinal direction of mold 80), supports 82 may be configured to support a plurality of sections 90 having different sizes and shapes, due to the matching outer shapes formed by supports 82. Therefore, an entire mold 80 formed by a plurality of sections 90 may be supported by stands 84 such that mold 80 may be rotated in the stands 84, providing easier access to the mold surface 81 for application of fiberglass material.

Each support 82 may form a continuous extension or arm including a plurality of portions having different shapes. For example, as shown in FIG. 6, support 82 may include a rounded or arced portion 87 having a rounded outer surface configured to contact a similarly-shaped surface of a respective cradle or stand 84. A substantially straight or flat portion 88 may extend laterally outwardly from arced portion 87 towards a top end of mold 80. A laterally-extending arm 89 may connect an end of portion 88 to a lateral end of the section 90 of mold 80 with which support 82 is integrally formed (e.g., molded with). A seam 85 may be formed at an inward end of arced portion 87 and may correspond to a center of mold 80 in a width direction (see also FIG. 9). Seam 85 may extend along a longitudinal direction of mold 80 and may be formed by a flange-shaped portion of section 90 (FIGS. 7A-9).

The shape of each support 82 may be altered based on the size and shape of the mold 80, as well as the section 90 on which each support 82 is integrally formed. For example, laterally-extending arm 89 may be shortened, or omitted, based on the shape of section 90, as shown in FIG. 5. In order to facilitate positioning of mold 80 on a series of stands 84, or directly on the floor or another suitable surface, at least a portion of each arced portion 87 may have approximately the same shape. For example, when arced portions 87 define a diameter or radius of curvature, each radius of curvature may be approximately equal.

In some aspects, with reference to FIGS. 7A and 7B, the entire mold 80 may be rotated while one or more circular supports 82 is positioned on a suitable surface (e.g., a floor of a manufacturing area). Once mold 80 is positioned or rotated as desired, mold 80 may be secured to a wedge 86. For example, wedge 86 and supports 82 may be clamped together (an exemplary clamp shown in FIG. 7A) to secure each section 90 of mold 80 in position. As shown in the front view of mold 80 in FIG. 7A, and in the side view of mold 80 in FIG. 7B, mold 80 may be positioned such that one or more supports 82 contact and lay upon the floor. For example, substantially straight or flat portions 88 of one or more supports may directly contact the floor, or other suitable surface. Supports 82 may provide a surface on which segments 90 may be rotated as desired (e.g., so as to rest upon a side of a plurality of segments, as shown in FIGS. 7A and 7B). For example, an outer surface of arced portion 87 may facilitate rotation of mold 80 along an outer curved surface of one or more arced portions 87. Mold 80 may, once positioned, be secured in place with wedge 86. For example, one or more supports 82 may be clamped, bolted, fastened, or otherwise secured to wedge 86. This configuration may also facilitate a process of applying the fiberglass material to surface 81 of mold 80.

Figure 8A:
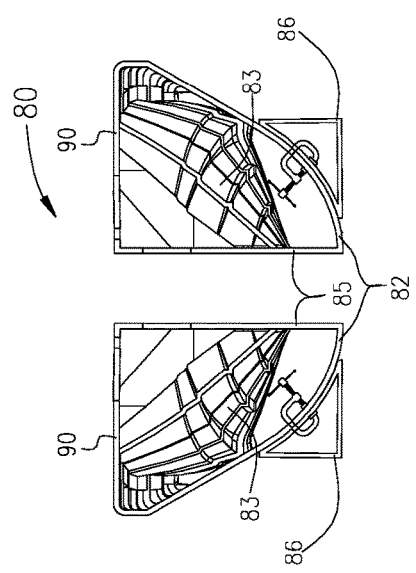
FIG. 8A is a front view of the exemplary 3D-printed mold of FIG. 5 showing the mold spilt into two halves for releasing the part.
Figure 8B:
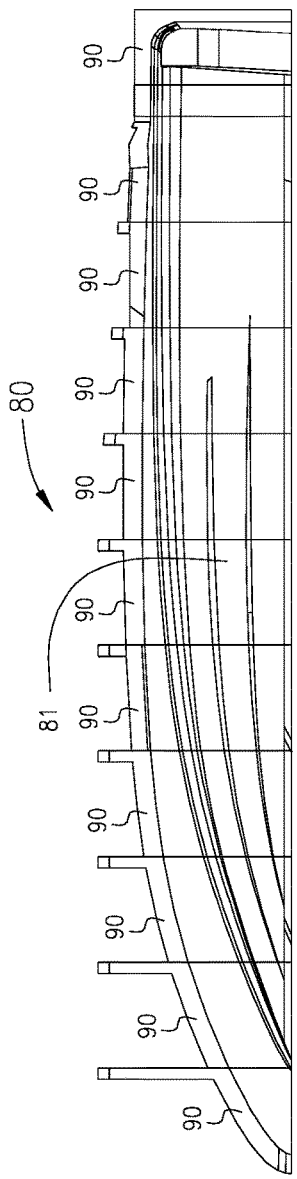
FIG. 8B is a side view of the exemplary 3D-printed mold of FIG. 5 showing the mold split into two halves for releasing the part

As shown in FIG. 8A and FIG. 8B, mold 80 may include two mold halves, each of which includes a portion of inside surface 81 formed on a respective mold section 80. The two halves may be fastened together along bottom seam 85. Seam 85 may be formed by bottom ends of outer surfaces 83 formed by the two halves of mold 80 and may therefore extend along an entire length of the hull.

In some aspects, the two mold halves, and each mold segment 90, may be secured together (FIGS. 5-7B) to facilitate the application of curable material, such as fiberglass material may be applied to an interior of mold 80 defined by surface 81. Once this material has fully or approximately fully cured, the two halves of mold 80 may facilitate removal of the fiberglass material. For example, as shown in the front view of FIG. 8A and the top view of FIG. 8B, when the fiberglass hull (not shown) is complete and the material, which may include fiberglass material, has fully or approximately fully cured, the two mold halves of mold 80 may be unfastened from each other and separated. This separation may facilitate removal of the finished fiberglass hull from mold 80. As illustrated in FIG. 8A, separation of the two halves of mold 80 may be performed while one or more mold sections 90 are fastened to a respective wedge 86. In particular, wedges 86 may be clamped (as shown in FIG. 8A), bolted, or fastened to supports 82 in any suitable manner. In some aspects, by fastening halves of mold 80 to wedges 86, the halves, supported by wedges 86, may be able to stand upright while the two halves are pulled part or otherwise separated.

Figure 9:
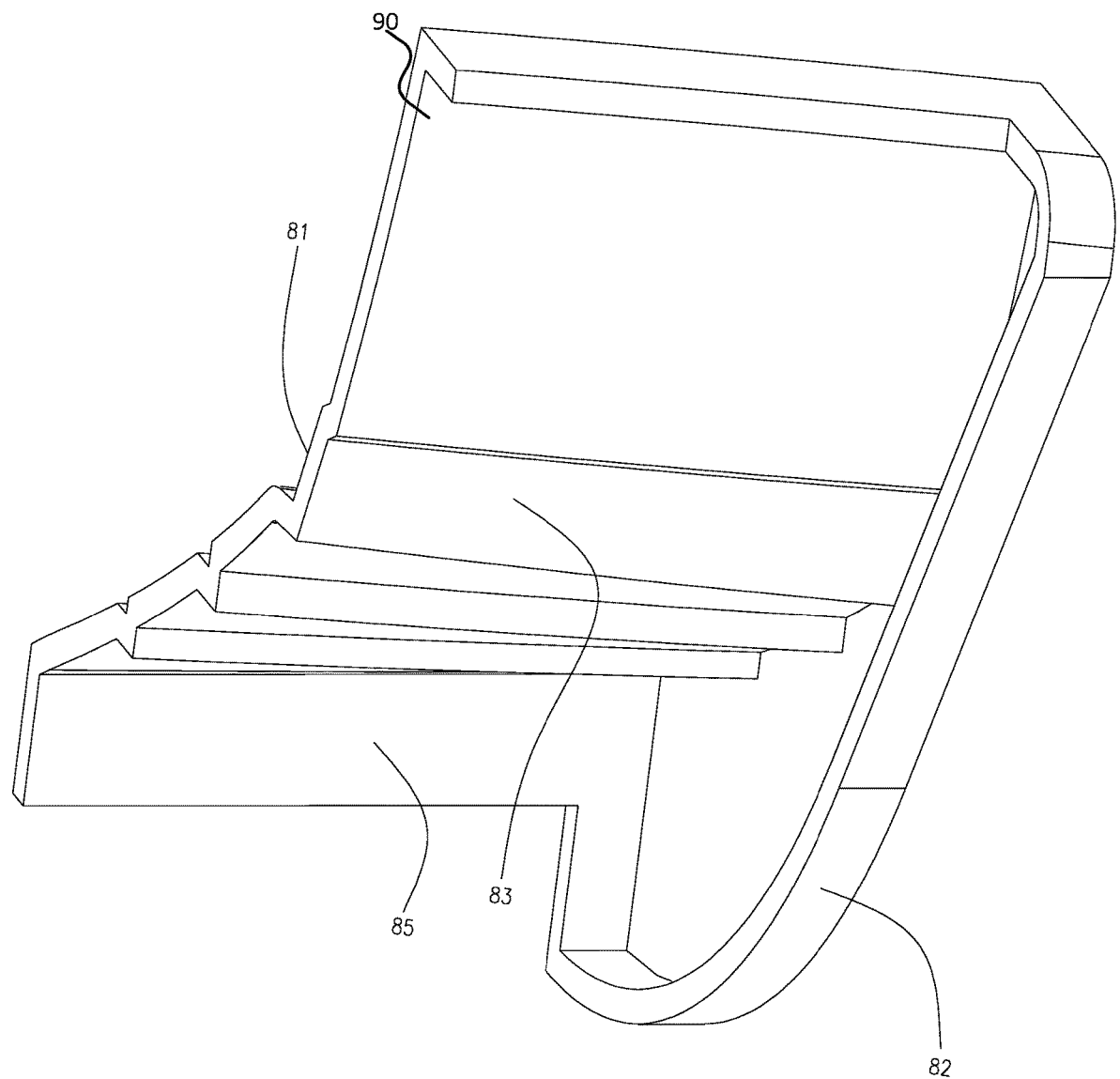
FIG. 9 is a perspective view of an exemplary section of the 3D-printed mold of FIG. 5.
Figure 10A:
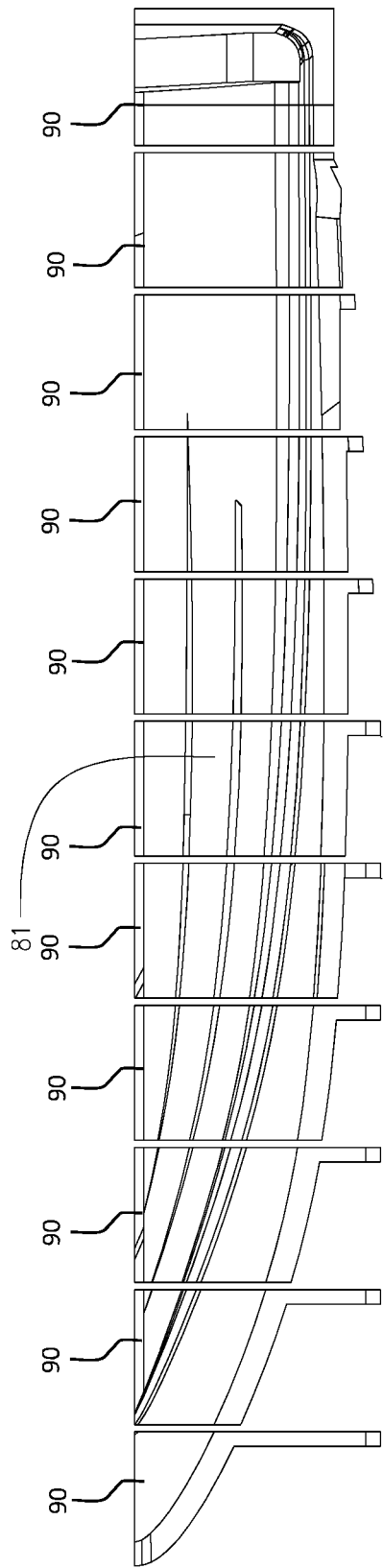
FIG. 10A is a top view of half of the 3D-printed mold of FIG. 5, separated into individual pieces.
Figure 10B:
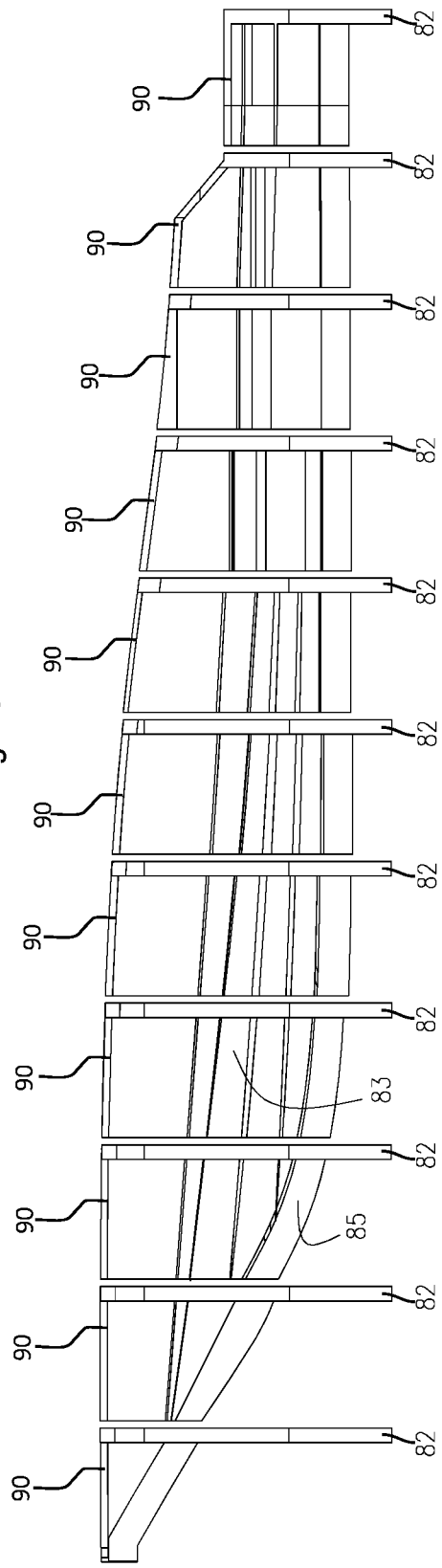
FIG. 10B is a side view of half of the 3D-printed mold of FIG. 5, separated into individual pieces.

In one aspect, by forming mold 80 by joining a plurality of mold sections 90, mold 80 may be considerably larger than the 3D printer, or other manufacturing apparatus(es), used to form the mold 80. A detailed view of an exemplary mold section 90 for forming one or more molds 80 is illustrated in FIG. 9. In some aspects, two or more sections 90 may be fastened to each other with permanent fasteners and/or bonded together at longitudinal ends thereof, to form each half of mold 80. Individual sections 90 may be attached or fastened together using various techniques. As an example, alignment holes may be machined into pairs of mating surfaces on each pair of adjacent sections 90. Alignment pins may be inserted within adjacent pairs of alignment holes, thereby assuring proper alignment of sections 90 with respect to one another. Sections 90 may then be bonded together utilizing an adhesive, or other bonding agent, suitable for the material being used (e.g., the material deposited by the additive manufacturing apparatus when forming sections 90). Additionally or alternatively to a bonding process, sections 90 may be aligned with respect to each other by pins (e.g., alignment pins extending through pairs of alignment holes), which may be clamped together with one or more suitable mechanical clamps. In another example, a series of cables may be positioned and stretched across an entire length of a half of mold 80. Thus, one or more cables may be securely attached to each end of a mold half and tensioned so as to secure all sections 90 of mold half firmly together. These two halves of mold 80, one of which is illustrated in FIG. 10A, may be subsequently fastened together with removable fasteners, such as the above-described clamps, to form a full hull mold 80. As shown in the top view of FIG. 10A and the side view of FIG. 10B, individual sections 90 of a half of mold 80 may be separated and individually positioned before these sections are permanently fastened or bonded together to form one of the two halves of the mold 80.

Although the above-described exemplary configurations include mold supports 82 that have a round shape and ride or are otherwise received in printed channels, this configuration is only one example. For example, the mold supports 82 may include one or more flat surfaces, such that the mold may rest directly on the floor. In another exemplary configuration, mold supports 82 may have one or more flat or angular portions that are received directly on the floor (or a worktable or other suitable surface) or by one or more suitably shaped (e.g., block-shaped) stands 84. When a flat platform or other suitable surface is provided, flat or other surfaces of mold supports 82 may facilitate positioning of an entirety of mold 80 and/or a section 90 or half of mold 80 in any suitable orientation.

An exemplary additive manufacturing method may be performed by receiving material by the additive manufacturing apparatus described with respect to FIGS. 1-4. Material may be deposited, in a layer-by-layer manner, in order to form one or more sections 90 of mold 80, including any of the features described with respect to FIGS. 5-10B. Two or more of these sections 90 may be joined together (e.g., in a permanent manner). These joined sections 90 may form a first half of mold 80, while a second plurality of sections 90 may be joined to form a second half of mold 80. The two halves may be supported by respective supports 82, as described above, and temporarily placed together (e.g., in contact with each other). Suitable curable material (e.g., fiberglass material) may be placed within mold 80 so as to contact surface 81. Once this material has cured, the two halves may be separated so as to release the cured hull. While the above-described method may be performed with two halves, it may be desirable to instead form mold 80 into thirds, fourths, fifths, etc.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing method, comprising:
   depositing thermoplastic material with an additive manufacturing apparatus to form a first section of a mold of a marine article, the first section including:
   a first interior surface having a shape corresponding to a first portion of a hull of the marine article;
   a first support portion including a first curved support surface, the first support portion being integrally formed with the first interior surface;
   depositing thermoplastic material to form a second section of the mold of the marine article, the second section including:
   a second interior surface having a shape corresponding to a second portion of the hull of the marine article; and
   a second support portion including a second curved support surface, the second support portion being integrally formed with the second interior surface and having approximately a same radius of curvature as the first curved support surface; and
   joining the first section and the second section together to form at least a portion of the mold such that the first and second curved support surfaces each extend below the hull so as to form gaps between the hull and the respective first and second curved support surfaces.

2. The method of claim 1, wherein the first section and the second section are formed with a same additive manufacturing apparatus.

3. The method of claim 1, further including rotating the first section along the first curved surface.

4. The method of claim 3, further including at least partially supporting the mold with a support stand that includes a curved surface having a shape complementary to a shape of the first curved surface of the first support portion by fastening the first section to the support stand after rotating the first section.

5. The method of claim 1, wherein joining the first section and the second section includes permanently joining the first section and the second section, and wherein the method further includes releasably securing a first mold half to a second mold half, the first mold half including the permanently joined first section and second section.

6. The method of claim 5, further including supporting at least one of the first mold half and the second mold half on a support in contact with the support surface.

7. The method of claim 5, further including separating the releasably secured first mold half and second mold half.

8. The method of claim 1, further including depositing the thermoplastic material with the additive manufacturing apparatus to form a third section of the mold of a marine article including a third support portion.

9. The method of claim 8, further including temporarily joining the third section to the first section and the second section to form at least a portion of a half of the mold for the hull of the marine article.

10. The method of claim 1, wherein the first curved support surface extends in a plane that is orthogonal to a longitudinal direction defined by the mold.

11. The method of claim 1, further including:
depositing the thermoplastic material with the additive manufacturing apparatus to form a third section of the mold of the marine article including a third support portion; and
bringing the first section and the third section into abutting contact with each other.

12. The method of claim 11, wherein the third support portion includes a third curved support surface that extends away from the first curved support surface when the first section and the third section are in abutting contact with each other.

13. A method, comprising:
providing material to an extruder of an additive manufacturing apparatus;
heating the material to form a flowable material;
depositing the flowable material with the additive manufacturing apparatus to form an interior portion having a shape corresponding to a portion of a hull of a marine article; and
depositing the flowable material with the additive manufacturing apparatus to form a support portion including a curved support surface, wherein the support portion and the interior portion are portions of a boat mold and the curved support surface extends below the hull so as to form a gap between the hull and the curved support surface.

14. The method of claim 13, wherein the support portion includes a round surface.

15. The method of claim 13, further including depositing flowable material to form a plurality of interior portions and a plurality of support portions with the additive manufacturing apparatus.

16. The method of claim 15, wherein the plurality of interior portions are formed on respective separate sections of the boat mold, wherein the boat mold is formed by permanently joining at least some of the separate sections.

17. The method of claim 13, further including releasably securing a plurality of sections of the boat mold to each other, each section including a respective interior portion having a shape corresponding to a respective portion of the hull of the marine article.

18. The method of claim 17, wherein the plurality of sections of the single boat mold form two halves of the boat mold.

19. The method of claim 13, wherein the curved support surface extends below the hull in a vertical direction and outwardly beyond the hull in a horizontal direction.

20. The method of claim 19, wherein the curved support surface includes a substantially straight portion extending from the curved support surface so as to extend outwardly beyond the hull in the horizontal direction.

* * * * *